US008948886B2

(12) United States Patent
Lee

(10) Patent No.: US 8,948,886 B2
(45) Date of Patent: Feb. 3, 2015

(54) LED LIGHTING SYSTEM AND CONTROLLING METHOD USING THE SAME

(75) Inventor: Kyungkook Lee, Seoul (KR)

(73) Assignee: TVLogic Co., Ltd., Seoul (KR)

( * ) Notice: Subject to any disclaimer, the term of this patent is extended or adjusted under 35 U.S.C. 154(b) by 0 days.

(21) Appl. No.: 14/342,915

(22) PCT Filed: Sep. 4, 2012

(86) PCT No.: PCT/KR2012/007072
§ 371 (c)(1),
(2), (4) Date: Mar. 5, 2014

(87) PCT Pub. No.: WO2013/036013
PCT Pub. Date: Mar. 14, 2013

(65) Prior Publication Data

US 2014/0191662 A1 Jul. 10, 2014

(30) Foreign Application Priority Data

Sep. 5, 2011 (KR) ........................ 10-2011-0089510

(51) Int. Cl.
*G05B 19/18* (2006.01)
*H05B 37/02* (2006.01)
*H05B 33/08* (2006.01)

(52) U.S. Cl.
CPC ........ *H05B 37/0263* (2013.01); *H05B 33/0863* (2013.01)
USPC ................................................. 700/2; 700/17

(58) Field of Classification Search
USPC ................................ 700/2, 11, 15, 17, 83, 86
See application file for complete search history.

(56) References Cited

U.S. PATENT DOCUMENTS

| | | | | |
|---|---|---|---|---|
| 7,515,128 | B2 * | 4/2009 | Dowling | 345/83 |
| 7,550,935 | B2 * | 6/2009 | Lys et al. | 315/318 |
| 8,742,686 | B2 * | 6/2014 | Zampini et al. | 315/297 |

FOREIGN PATENT DOCUMENTS

| | | | |
|---|---|---|---|
| JP | 2011-71060 | A | 4/2011 |
| JP | 2011-113761 | A | 6/2011 |
| KR | 10-2004-0100481 | A | 12/2004 |
| KR | 10-2008-0022298 | A | 3/2008 |
| KR | 10-0921755 | B1 | 10/2009 |

OTHER PUBLICATIONS

International Search Report mailed Feb. 21, 2013, issued in corresponding International Application No. PCT/KR2012/007072.

* cited by examiner

*Primary Examiner* — Thuy Vinh Tran
(74) *Attorney, Agent, or Firm* — Stein IP, LLC

(57) ABSTRACT

A LED lighting system and a controlling method using the same is disclosed. In accordance with the present invention, a central controller extracts an ID information assigned to each of one or more LED lighting devices using a power line communication and classifies the extracted ID information into ID groups according to a user command by assigning a management information thereto to enable controlling of the one or more LED lighting devices based on the management information.

18 Claims, 6 Drawing Sheets

LED LIGHTING SYSTEM AND CONTROLLING METHOD USING THE SAME

CROSS-REFERENCE TO RELATED APPLICATIONS

This application is a national phase of International Application No. PCT/KR2012/007072, filed Sep. 4, 2012, which claims the benefit of Korean Application No. 10-2011-0089510, filed Sep. 5, 2011, in the Korean Intellectual Property Office. All disclosures of the document(s) named above are incorporated herein by reference.

BACKGROUND OF THE INVENTION

1. Field of the Invention

The present invention relates to a LED lighting system and a controlling method using the same, and particularly to a LED lighting system and a controlling method using the same wherein a central controller extracts an ID information assigned to each of one or more LED lighting devices using a power line communication and classifies the extracted ID information into ID groups according to a user input by assigning a management information thereto to enable controlling of the one or more LED lighting devices based on the management information.

2. Description of the Related Art

Generally, buildings such as a house and a business center are equipped with various lighting devices in order to illuminate insides thereof. Fluorescent lights and incandescent lights are used as the various lighting devices. However, since the various lighting devices such as the fluorescent lights or the incandescent lights have high power consumptions and short life spans, maintenance costs are very high.

For this reason, use of LED lighting devices with lower power consumptions and longer life spans have rapidly increased.

A user can easily turn on and off the LED lighting devices with a switch when there are only small number of LED lighting devices in a home. However, it is very difficult for the user to turn on and off the LED lighting devices when there are a large number of LED lighting devices such as in business centers, larger buildings and exhibition hall.

In order to overcome above-described problems, a central management system for a large number of the LED lighting devices has been proposed. However, the conventional central management system requires separate communication lines for managing the LED lighting devices, which results in high installation costs. In addition, when more LED lighting devices is added, additional communication lines must be installed, resulting in additional installation costs and maintenance costs.

SUMMARY OF THE INVENTION

Technical Problem

It is an object of the present invention to provide a LED lighting system and a controlling method using the same wherein a central controller extracts an ID information assigned to each of one or more LED lighting devices using a power line communication and classifies the extracted ID information into ID groups according to a user input by assigning a management information thereto to enable controlling of the one or more LED lighting devices based on the management information.

Technical Solution

In order to achieve above-described object of the present invention, there is provided a LED lighting system comprising: a first lighting device through an $N^{th}$ lighting device wherein each of the first lighting device through the $N^{th}$ lighting device comprises a light source, a lighting device power line modem for performing a power line communication and a lighting controller for controlling the light source and the lighting device power line modem, the first lighting device through the $N^{th}$ lighting device storing a first ID information through an $N^{th}$ ID information in the lighting controller thereof, respectively; and a central controller for controlling each of the first lighting device through the $N^{th}$ lighting device wherein the central controller comprises a central power line modem connected to the lighting device power line modem of each of the first lighting device through the $N^{th}$ lighting device through power lines to perform the power line communication, a memory for storing a management program for managing the first lighting device through the $N^{th}$ lighting device; and a processor for executing the management program stored in the memory, wherein the management program comprises: a first instruction for extracting the first ID information through the $N^{th}$ ID information from the first lighting device through the $N^{th}$ lighting device, respectively, through the power line communication between the lighting device power line modem of each of the first lighting device through the $N^{th}$ lighting device and the central power line modem; a second instruction for classifying the first ID information through the $N^{th}$ ID information extracted by the first instruction into ID groups according to a user input; a third instruction for assigning a management information to each of the ID groups classified by the second instruction; and a fourth instruction for displaying the management information (where N is a natural number).

Preferably, the first instruction comprises: a first sub-instruction for generating a request message requesting the first ID information through the $N^{th}$ ID information, and transmitting the request message to the lighting device power line modem of each of the first lighting device through the $N^{th}$ lighting device through the central power line modem; and a second sub-instruction for receiving the first ID information through the $N^{th}$ ID information from the lighting controller of each of the first lighting device through the $N^{th}$ lighting device through the lighting device power line modem of each of the first lighting device through the $N^{th}$ lighting device, respectively.

The LED lighting control system in accordance with the present invention may further comprise a display device connected to the central controller for displaying the first ID information through the $N^{th}$ ID information and the management information.

Preferably, the second instruction comprises: a first sub-instruction for transmitting the first ID information through the $N^{th}$ ID information to the display device; and a second sub-instruction for classifying the first ID information through the $N^{th}$ ID information into the ID groups according to the user input.

Preferably, the management program further comprises a fifth instruction for controlling the first lighting device through the $N^{th}$ lighting device according to the management information and a user command.

Preferably, the fifth instruction issues one of an on/off command for turning on or off each of the first lighting device through the $N^{th}$ lighting device, a dimming control command for dimming each of the first lighting device through the $N^{th}$ lighting device, a color control command for selecting a color of light emitted from each of the first lighting device through the $N^{th}$ lighting device and a timer control command for controlling on-time or off-time of each of the first lighting device through the $N^{th}$ lighting device to control each of the first lighting device through the $N^{th}$ lighting device.

Preferably, the central controller further comprises a communication means for communicating with an external terminal device.

Preferably, the management program further comprises a sixth instruction for transmitting the management information to the external terminal device in response to a request from the external terminal device.

Preferably, the management program further comprises a seventh instruction for controlling each of the first lighting device through the $N^{th}$ lighting device according to a user command provided by the external terminal device.

There is also provided a method for controlling a first lighting device through an $N^{th}$ lighting device of a LED lighting system comprising a central controller for controlling the first lighting device through the $N^{th}$ lighting device, wherein each of the first lighting device through the $N^{th}$ lighting device comprises a light source, a lighting device power line modem for performing a power line communication and a lighting controller for controlling the light source and the lighting device power line modem, the first lighting device through the $N^{th}$ lighting device storing a first ID information through an $N^{th}$ ID information in the lighting controller thereof, respectively; and the central controller for controlling each of the first lighting device through the $N^{th}$ lighting device wherein the central controller comprises a central power line modem connected to the lighting device power line modem of each of the first lighting device through the $N^{th}$ lighting device through power lines to perform the power line communication, a memory for storing a management program for managing the first lighting device through the $N^{th}$ lighting device; and a processor for executing the management program stored in the memory, the method comprising: (a) extracting the first ID information through the $N^{th}$ ID information from the lighting controller of each of the first lighting device through the $N^{th}$ lighting device, respectively, through the power line communication between the lighting device power line modem of each of the first lighting device through the $N^{th}$ lighting device and the central power line modem; (b) classifying the first ID information through the $N^{th}$ ID information extracted by the central controller into ID groups according to a user input; (c) assigning a management information to each of the ID groups classified by the central controller; and (d) displaying the management information.

Preferably, the step (a) comprises: (a-1) transmitting a request message requesting the first ID information through the $N^{th}$ ID information generated by the central controller to the lighting controller of each of the first lighting device through the $N^{th}$ lighting device, (a-2) modulating the first ID information through the $N^{th}$ ID information into a PLC signal using the lighting controller of each of the first lighting device through the $N^{th}$ lighting device to be transmitted to the central controller; and (a-3) demodulating the PLC signal into the first ID information through the $N^{th}$ ID information.

Preferably, the step (b) comprises: (b-1) transmitting the first ID information through the $N^{th}$ ID information to a display device connected to the central controller; and (b-2) classifying the first ID information through the $N^{th}$ ID information into the ID groups according to the user input.

The method in accordance with the present invention may further comprise (e) controlling the first lighting device through the $N^{th}$ lighting device according to the management information and a user command after performing the step (d).

Preferably, the step (e) comprises: (e-1) transmitting an ID information associated with the management information and a control command corresponding to the user command to each of the first lighting device through the $N^{th}$ lighting device by the central controller: and (e-2) executing the control command in any of the first lighting device through the $N^{th}$ lighting device having an ID information matching the ID information transmitted in the step (e-1).

Preferably, the control command comprises one of an on/off command for turning on or off each of the first lighting device through the $N^{th}$ lighting device, a dimming control command for dimming each of the first lighting device through the $N^{th}$ lighting device, a color control command for selecting a color of light emitted from each of the first lighting device through the $N^{th}$ lighting device and a timer control command for controlling on-time or off-time of each of the first lighting device through the $N^{th}$ lighting device to control each of the first lighting device through the $N^{th}$ lighting device.

The method in accordance with the present invention may further comprise (f) communicating with an external terminal device using a communication means controlled by the central controller after performing the step (d).

Preferably, the step (f) comprises transmitting the management information to the external terminal device in response to a request from the external terminal device.

The method in accordance with the present invention may further comprise (g) controlling each of the first lighting device through the $N^{th}$ lighting device according to a user command provided by the external terminal device after performing the step (f).

Advantageous Effects

Since Power lines are used in place of separate communication lines for the connection between a central controller and one or more LED lighting devices in accordance with a LED lighting control system and a control method using the same of the present invention, an installation cost may be reduced. Further, even when LED lighting devices are additionally installed, additional communication lines are not required. In addition, even the one or more LED lighting devices are replaced, arbitrary LED lighting devices can be connected to LED lighting control system in accordance with the present invention as long as the arbitrary LED lighting device regardless of manufacturers has an ID information.

In addition, the management of the one or more LED lighting devices is facilitated by classifying ID informations extracted from the one or more LED lighting devices into ID groups and assigning the management information to the ID groups.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

A LED lighting control system and a control method using the same in accordance with the present invention will now be described in detail with reference to the accompanied drawings.

Figure 1:
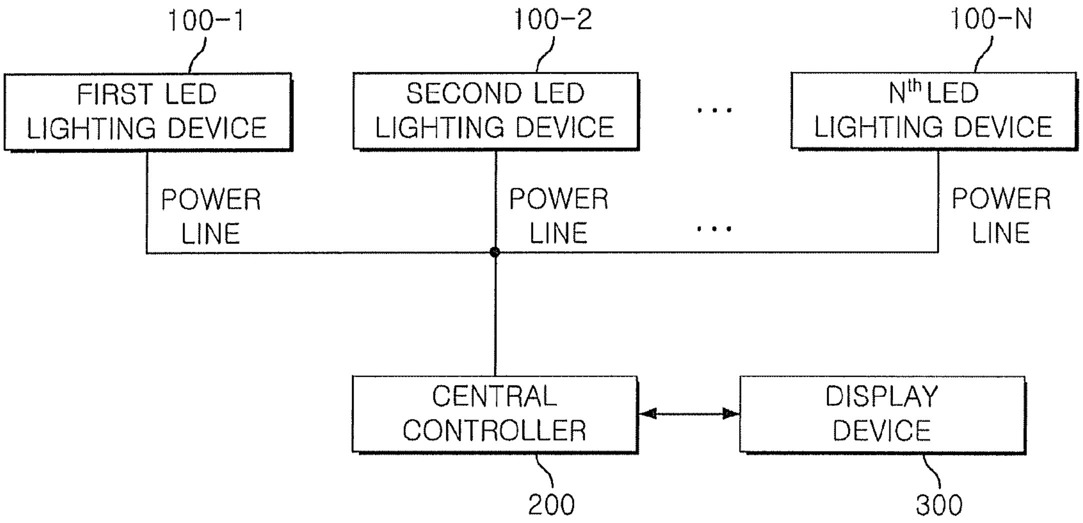
FIG. 1 is a block diagram schematically illustrating a LED lighting control system in accordance with the present invention.

FIG. 1 is a block diagram schematically illustrating a LED lighting control system in accordance with the present invention.

Referring to FIG. 1, the LED lighting control system in accordance with the present invention comprises one or more LED lighting devices, i.e., a first LED lighting device 100-1 through an $N^{th}$ LED lighting device 100-N and a central controller 200. In addition, the LED lighting control system in accordance with the present invention further comprises a display device 300.

The first LED lighting device 100-1 through the $N^{th}$ LED lighting device 100-N are connected to the central controller 200 through power lines. That is, the first LED lighting device 100-1 through the $N^{th}$ LED lighting device 100-N perform power line communications with the central controller 200.

The central controller 200 performs the power line communication with the first LED lighting device 100-1 through the $N^{th}$ LED lighting device 100-N to extract a first ID information through an $N^{th}$ ID information assigned to the first LED lighting device 100-1 through the $N^{th}$ LED lighting device 100-N, respectively.

The central controller 200 classifies the first ID information through the $N^{th}$ ID information obtained through the power line communication into ID groups, and assigns a management information to each of the ID groups. Specifically, the central controller 200 classifies the first ID information through the $N^{th}$ ID information into the ID groups according to a correlation thereof, and assigns the management information to each of the ID groups classified by the central controller 200 based on a user input. A user may provide a user command for controlling the first LED lighting device 100-1 through the $N^{th}$ LED lighting device 100-N to the central controller 200 by referring to the management information, and the central controller 200 may transmit, to the first LED lighting device 100-1 through the $N^{th}$ LED lighting device 100-N, a control command and the ID information corresponding to the management information to control the LED lighting device storing the ID information.

The first LED lighting device 100-1 through the $N^{th}$ LED lighting device 100-N store the first ID information through the $N^{th}$ ID information, respectively, and are connected to the central controller 200 through the power lines. The first LED lighting device 100-1 through the $N^{th}$ LED lighting device 100-N may transmit the first ID information through the $N^{th}$ ID information to the central controller 200 through the power lines, respectively, and receive the control command and the ID information corresponding to the management information from the central controller 200. Any of the first LED lighting device 100-1 through the $N^{th}$ LED lighting device 100-N having the ID information that matches the ID information received from the central controller 200 executes the control command.

The display device 300 is connected to the central controller 200 to display the first ID information through the $N^{th}$ ID information and the management information. Specifically, the display device 300 provides the first ID information through the $N^{th}$ ID information and the management information to the user after receiving the same from the central controller 200. The user may provide the user input required for classifying the first ID information through the $N^{th}$ ID information into the ID groups by referring to the first ID information through the $N^{th}$ ID information and the management information displayed on the display device 300 and the user command for controlling the first LED lighting device 100-1 through the $N^{th}$ LED lighting device 100-N by referring to the management information displayed on the display device 300.

The LED lighting control system with three LED lighting devices (N=3) in accordance with an embodiment of the present invention will be described hereinafter in more detail with reference to FIG. 2.

Figure 2:
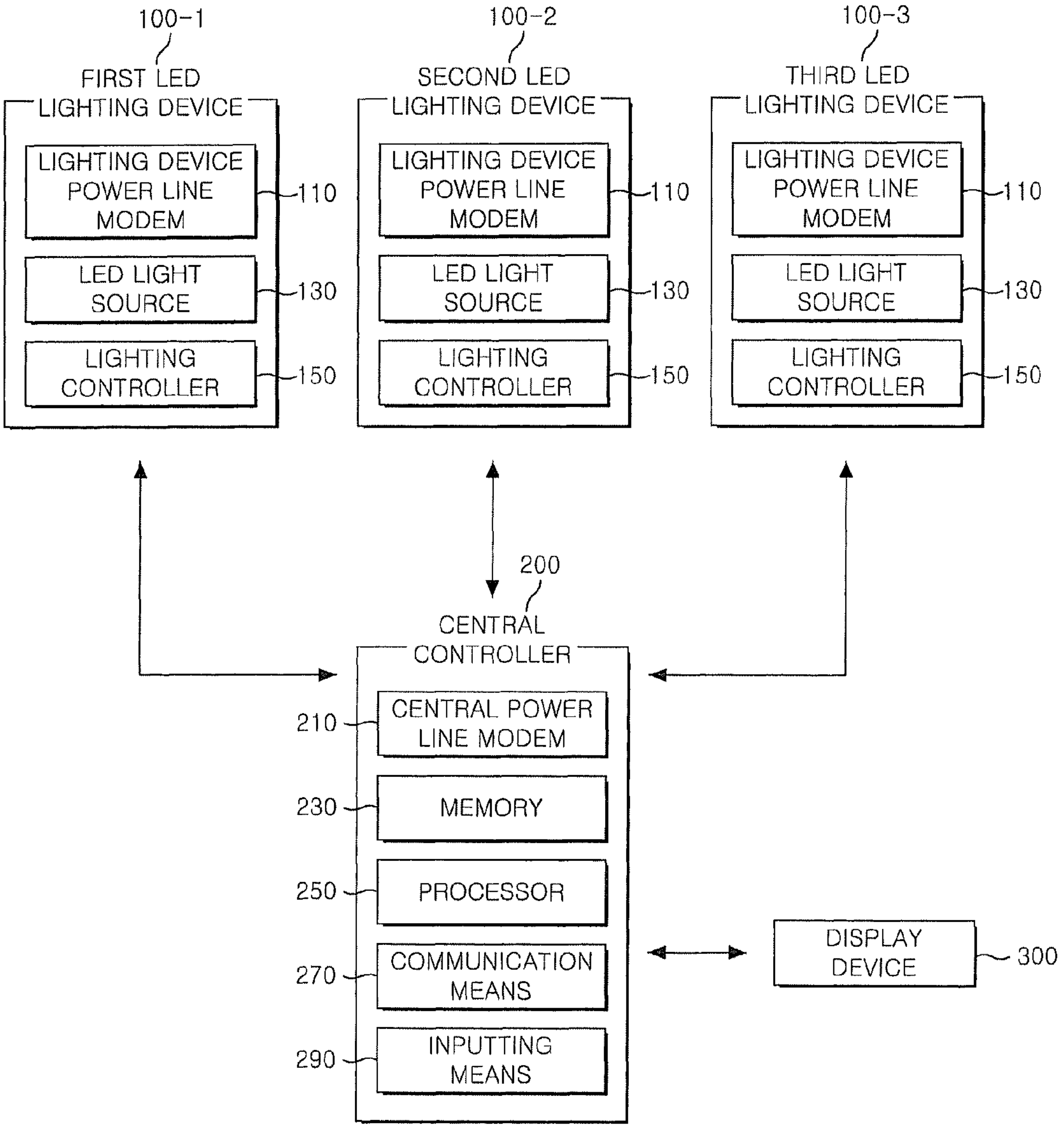
FIG. 2 is a block diagram illustrating a LED lighting control system in accordance with the present invention.

FIG. 2 is a block diagram illustrating the LED lighting control system in accordance with the present invention.

Referring to FIG. 2, the LED lighting control system in accordance with the present invention comprises the first LED lighting device 100-1 through the third LED lighting device 100-3 and the central controller 200. In addition, the LED lighting control system in accordance with the present invention may further comprise the display device 300.

The central controller 200 comprises a central power line modem 210, a memory 230 and a processor 250. In addition, the central controller 200 may further comprise a communication means 270.

The central power line modem 210 is connected to a lighting device power line modem 110 included in each of the first LED lighting device 100-1 through the third LED lighting device 100-3 through power lines to perform the power line communication.

Specifically, the central power line modem 210 transmits the request message generated by the processor 250 to the first LED lighting device 100-1 through the third LED lighting device 100-3. That is, the central power line modem 210 transmits the request message requesting the first ID information through the third ID information stored in a lighting controller 150 included in each of the first LED lighting device 100-1 through the third LED lighting device 100-3.

Preferably, the central power line modem 210 transmits the request message to the lighting device power line modem 110 by modulating the request message into a first PLC signal which is suitable for the power line communication.

The memory 230 stores a management program for managing the first LED lighting device 100-1 through the third LED lighting device 100-3 and provides a resource required by the processor 250 during the execution of the management program. Preferably, the memory 230 may include various memory elements such as a DRAM (Dynamic Random Access Memory), SRAM (Synchronous dynamic Random Access Memory) and a non-volatile memory.

The processor 250 executes the management program, and controls each of components of the central controller 200.

Figure 3:
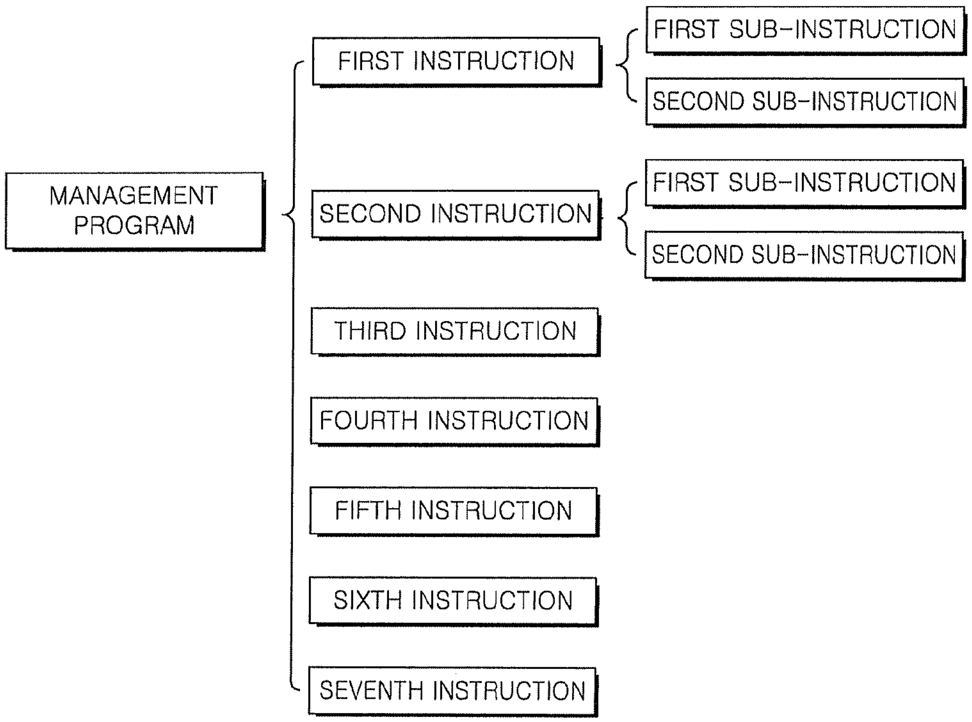
FIG. 3 exemplifies a construction of a management program in accordance with the present invention.

FIG. 3 exemplifies a construction of a management program in accordance with the present invention.

The processor 250 executes a first instruction through a seventh instruction included in the management program to control the first LED lighting device 100-1 through the third LED lighting device 100-3.

First, a process of executing the first instruction through the fifth instruction by processor 250 is described below.

The processor 250 extracts the first ID information through the third ID information from the first LED lighting device 100-1 through the third LED lighting device 100-3, respectively, via the power line communication between the lighting device power line modem 110 and the central power line modem 210 by executing the first instruction. Preferably, the first instruction includes a first sub-instruction and a second sub-instruction.

The processor 250 generates the request message requesting the ID informations and transmits the same to the lighting controller 150 included in each of the first LED lighting device 100-1 through the third LED lighting device 100-3 through the central power line modem 210 by executing the first sub-instruction of the first instruction. Preferably, the central power line modem 210 may modulate the request message into the first PLC signal which is suitable for the power line communication and transmit the first PLC signal to the lighting controller 150 of each of the first LED lighting device 100-1 through the third LED lighting device 100-3 via the lighting device power line modem 110.

When the lighting device power line modem 110 receives the first PLC signal from the central power line modem 210, the lighting device power line modem 110 transmits the request message to the lighting controller 150 after demodulating the first PLC signal into the request message. The lighting controller 150 then transmits the ID information stored therein to the lighting device power line modem 110 according to the request message, and the lighting device power line modem 110 modulates the ID information received from the lighting controller 150 into a second PLC signal and transmits the same to the central power line modem 210. Above process is carried out in each of the first LED lighting device 100-1 through the third LED lighting device 100-3.

The processor 250 then receives the first ID information through the third ID information from the lighting device power line modems 110 of the first LED lighting device 100-1 through the third LED lighting device 100-3, respectively, by executing the second sub-instruction of the first instruction. Specifically, when the central power line modem 210 receives the second PLC signals from the lighting device power line modem 110 included in each of the first LED lighting device 100-1 through the third LED lighting device 100-3, the central power line modem 210 demodulates the first ID information through the third ID information from the second PLC signals.

The processor 250 then classifies the first ID information through the third ID information into ID groups based on the user input by executing the second instruction. Preferably, the second instruction includes a first sub-instruction and a second sub-instruction.

The processor 250 transmits the first ID information through the third ID information to the display device 300 by executing the first sub-instruction of the second instruction. The display device 300 displays the first ID information through the third ID information to be provided to a user.

The processor 250 classifies the first ID information through the third ID information into the ID groups by executing the second sub-instruction of the second instruction. Specifically, when the display device 300 provides the first ID information through the third ID information to the user, the user provides, via an inputting means 290 such as a touch screen or a remote controller, the user input on which the classification of the first ID information through the third ID information can be classified into the ID groups is based by referring to the first ID information through the third ID information displayed on the display device 300. The inputting means 290 transmits the user input to the processor 250 once the user input is received, and the processor 250 classifies the first ID information through the third ID information into the ID groups according to the user input.

The processor 250 then assigns the management information to each of the ID groups by executing the third instruction.

The management information may include a name for each ID group. For instance, the management information may include a name designating specific spaces such as "ROOM1", "BATHROOM", "BEDROOM", "CORRIDOOR" and "STAIRS" so that the user can easily identify and manage the ID groups.

The processor 250 then displays the management information by executing the fourth instruction. That is, the processor 250 transmits the management information to the display device 300 to be displayed thereon so that the user may control the first LED lighting device 100-1 through the third LED lighting device 100-3.

The processor 250 controls the first LED lighting device 100-1 through the third LED lighting device 100-3 based on the management information and the user command by executing the fifth instruction.

Specifically, the processor 250 generates the control command for controlling the first LED lighting device 100-1 through the third LED lighting device 100-3 from the user command provided by the user and transmits the control command and the ID information according to the management information to the first LED lighting device 100-1 through the third LED lighting device 100-3 by executing the fifth instruction. Each of the lighting controller 150 of the first LED lighting device 100-1 through the third LED lighting device 100-3 compares the ID information stored therein with the ID information received from the processor 250, and at least one of the first LED lighting device 100-1 through the third LED lighting device 100-3 having the ID information that matches the received ID information executes the control command.

Preferably, the control command may comprise one of an on/off command for turning on or off each of the first LED lighting device 100-1 through the third LED lighting device 100-3, a dimming control command for dimming each of the first LED lighting device 100-1 through the third LED lighting device 100-3, a color control command for selecting a color of light emitted from each of the first LED lighting device 100-1 through the third LED lighting device 100-3 and a timer control command for controlling on-time or off-time of each of the first LED lighting device 100-1 through the third LED lighting device 100-3.

The LED lighting control system in accordance with the present invention is capable of communicating with an external terminal device such as a smart phone and a computing device so that the first LED lighting device 100-1 through the third LED lighting device 100-3 can be controlled by the external terminal device.

That is, the processor 250 executes the sixth instruction and the seventh instruction to communicate with the external terminal device and control the first LED lighting device 100-1 through the third LED lighting device 100-3.

Second, a process of executing the sixth instruction and the seventh instruction by the processor 250 is described below.

The processor 250 transmits the management information to the external terminal device by executing the sixth instruction in response to a request thereof. Specifically, the central controller 200 communicates with the external terminal device through the communication means 270 to receive the request message requesting the management information. The processor 250 may transmit the management information to the external terminal device through the communication means 270 in response to the request message by executing the sixth instruction.

The processor 250 controls the first LED lighting device 100-1 through the third LED lighting device 100-3 according to the user command provided from the external terminal device by executing the seventh instruction.

Specifically, when the processor 250 executes the seventh instruction to transmit the control command included in the user command received from the external terminal device and the ID information to the first LED lighting device 100-1 through the third LED lighting device 100-3, each of the lighting controller 150 of the first LED lighting device 100-1 through the third LED lighting device 100-3 compares the ID information stored therein with the ID information received from the processor 250. At least one of the first LED lighting device 100-1 through the third LED lighting device 100-3 having the ID information that matches the received ID information executes the control command.

The communication means 270 communicates with the external terminal device. Preferably, the communication means 270 may communicate with the external terminal device through one of a WLAN (Wireless LAN) and a mobile communication network. For instance, the communication means 270 may communicate with a computing device through the WLAN or with a smart phone through the mobile communication network.

Each of the first LED lighting device 100-1 through the third LED lighting device 100-3 comprises the lighting device power line modem 110, a light source 130 and the lighting controller 150.

The lighting device power line modem 110 is connected to the central power line modem 210 included in the central controller 200 through the power lines to perform the power line communication.

Specifically, each lighting device power line modem 110 receives the first PLC signal from the central power line modem 210. Each lighting device power line modem 110 demodulates the first PLC signal into the request message to be transmitted to the lighting controller 150.

In addition, each lighting device power line modem 110 modulates the ID information received from the lighting controller 150 to the second PLC signal to be transmitted to the central power line modem 210.

The light source 130 is controlled by the lighting controller 150 to radiate light.

The lighting controller 150 stores the ID information and controls the lighting device power line modem 110 and the light source 130.

Specifically, the lighting controller 150 receives the request message from the lighting device power line modem 110 and transmits the ID information to the central power line modem 210 through the lighting device power line modem 110 in response to the request message. Moreover, the lighting controller 150 is controlled by the processor 250 to control the light source 130.

More specifically, the lighting controller 150 compares the ID information stored therein with the ID information received from the processor 250 and activates the light source 130 according to the control command received from the processor 250 when the ID information received from the processor 250 matches the stored ID information.

The display device 300 provides the ID information and the management information received from the processor 250 to the user by displaying the same thereon.

A process of executing the first instruction through the seventh instruction by the processor 250 is described with reference to FIGS. 4 and 5.

Figure 4:
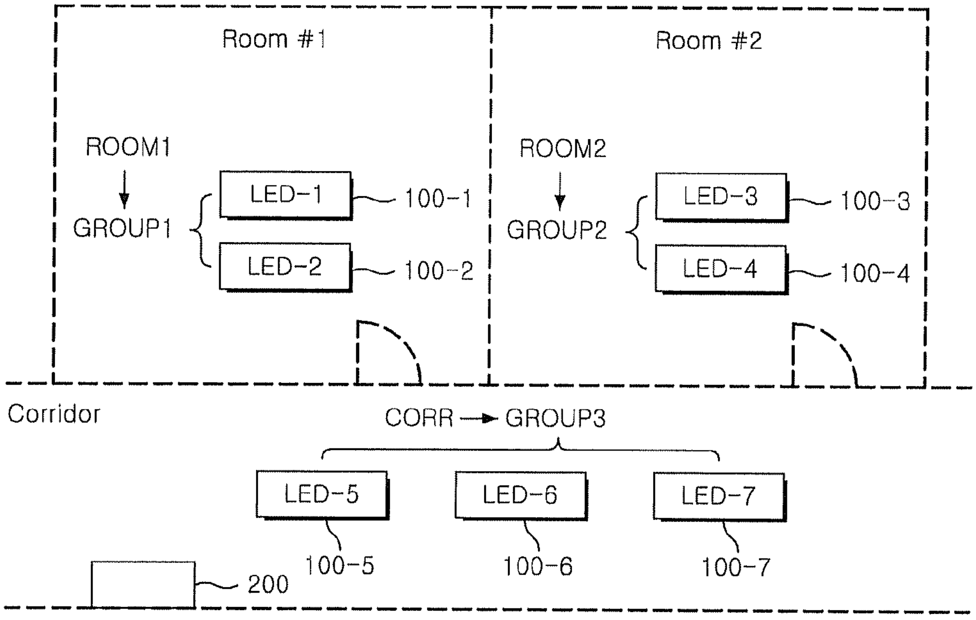
FIGS. 4 and 5 are diagrams exemplifying an embodiment of a LED lighting control system in accordance with the present invention.
Figure 5:
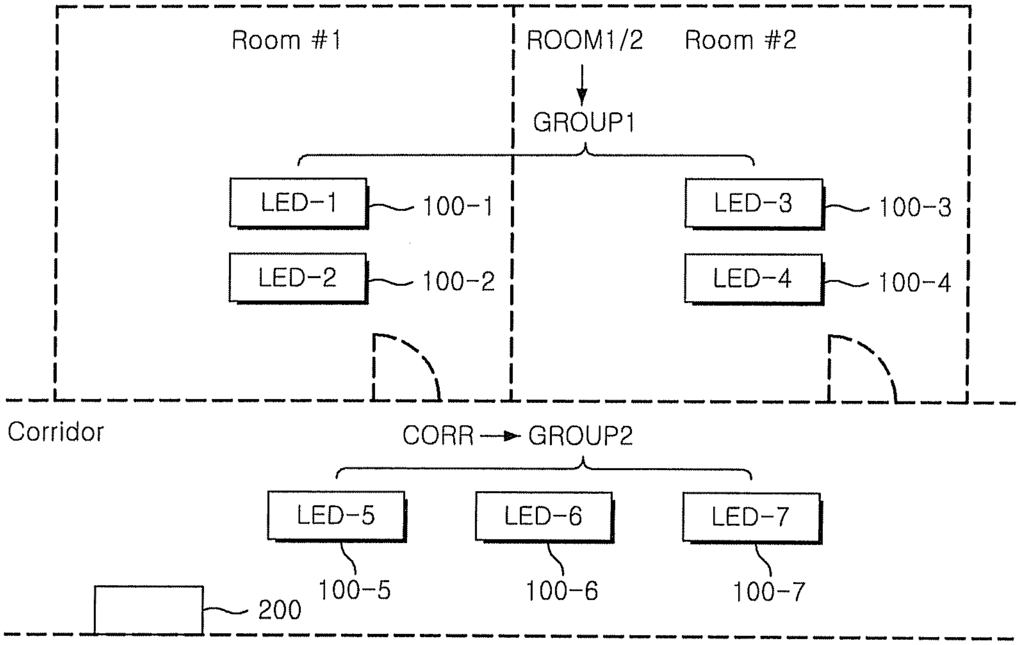

FIGS. 4 and 5 exemplify a LED lighting control system in accordance with the present invention.

Referring to FIGS. 4 and 5, the LED lighting control system in accordance with the present invention comprises the first LED lighting device 100-1 through the seventh LED lighting device 100-7 and the central controller 200.

The first LED lighting device 100-1 through the seventh LED lighting device 100-7 are connected to the central controller 200 through power lines. That is, the first LED lighting device 100-1 through the seventh LED lighting device 100-7 perform the power line communication with the central controller 200 through the power lines. Since the constitutions of the first LED lighting device 100-1 through the seventh LED lighting device 100-7 and the central controller 200 are identical to those of the LED lighting control system shown in FIG. 2, the detailed descriptions thereof are omitted.

When a user desires to manage the first LED lighting device 100-1 through the seventh LED lighting device 100-7 using a touch screen included in the central controller 200, the user enters a command into the central controller 200 to execute the management program stored therein using the touch screen.

The processor 250 included in the central controller 200 (shown in FIG. 2) extracts ID informations, i.e., a first ID information LED-1 through a seventh ID information LED-7 from the first LED lighting device 100-1 through the seventh LED lighting device 100-7, respectively, through the power line communications between the lighting device power line modem 110 of each of the first LED lighting device 100-1 through the seventh LED lighting device 100-7 and the central power line modem 210 by executing the first instruction.

That is, the processor 250 extracts the first ID information LED-1 through the seventh ID information LED-7 from the lighting controllers 150 (shown in FIG. 2) included in the first LED lighting device 100-1 through the seventh LED lighting device 100-7, respectively, by executing the first instruction.

The processor 250 then classifies the extracted ID informations into the ID groups based on a user input by executing the second instruction.

That is, when the processor 250 provides, via the display device 300, to the user the first ID information LED-1 through the seventh ID information LED-7 assigned to the first LED lighting device 100-1 through the seventh LED lighting device 100-7, respectively, the user selects the ID informations to be grouped.

In one embodiment, when the user desires to manage the first LED lighting device 100-1 and the second LED lighting device 100-2 installed in Room #1 shown in FIG. 4 simultaneously, the third LED lighting device 100-3 and the fourth LED lighting device 100-4 installed in Room #2 shown in FIG. 4 simultaneously, and the fifth LED lighting device 100-5 through the seventh LED lighting device 100-7 installed in Corridor shown in FIG. 4 simultaneously, the user may select the first LED lighting device 100-1 and the second LED lighting device 100-2 to be grouped into a first group GROUP1, the third LED lighting device 100-3 and the fourth LED lighting device 100-4 to be grouped into a second group GROUP 2, and the fifth LED lighting device 100-5 through the seventh LED lighting device 100-7 to be grouped into a third group GROUP3.

In another embodiment, when the user desires to manage the first LED lighting device 100-1 through the fourth LED lighting device 100-4 installed in Room #1 and Room #2 shown in FIG. 5 simultaneously, and the fifth LED lighting device 100-5 through the seventh LED lighting device 100-7 installed in Corridor shown in FIG. 5 simultaneously, the user may select the first LED lighting device 100-1 through the fourth LED lighting device 100-4 to be grouped into a first group GROUP1 and the fifth LED lighting device 100-5 through the seventh LED lighting device 100-7 to be grouped into a second group GROUP2.

The central controller 200 may provide a process of identifying LED lighting devices so that the user can identify where each of the first LED lighting device 100-1 through the seventh LED lighting device 100-7 is installed.

For instance, when the user selects one of the first LED lighting device 100-1 through the seventh LED lighting device 100-7 displayed on the display device 300 via the touch screen during an identification process, the central controller 200 turns on and off the selected LED lighting device so that the user can identify where the selected LED lighting device is installed.

Specifically, the central controller 200 may transmit the ID information corresponding the selected LED lighting device and the control command for flashing the selected LED lighting device to the first LED lighting device 100-1 through the seventh LED lighting device 100-7 through the central power line modem 210. Each of the lighting controller 150 of the first LED lighting device 100-1 through the seventh LED lighting device 100-7 then compares the ID information stored therein with the ID information received from the central controller 200.

For instance, when the user selects the second LED lighting device 100-2 for identification, the central controller 200 transmits the second ID information LED-2 and the control command for flashing the second LED lighting device 100-2 to each of the first LED lighting device 100-1 through the seventh LED lighting device 100-7. Each lighting controller 150 of the first LED lighting device 100-1 through the seventh LED lighting device 100-7 compares the ID information stored therein with the second ID information LED-2 received from the central controller 200. The second LED lighting device 100-2 having the ID information which is identical to the ID information transmitted from the central controller 200 flashes according to the control command. Through such process, the LED lighting device can be easily identified.

The processor 250 then assigns the management information to the ID groups by executing the third instruction after ID informations are classified into the ID groups by executing the second instruction.

For instance, when the first ID information LED-1 through the seventh ID information LED-7 of the first LED lighting device 100-1 through the seventh LED lighting device 100-7 are classified into the first group GROUP1 through the third group GROUP3 as shown in FIG. 4, the processor 250 displays informations on the first group GROUP1 through the third group GROUP3 on the display device 300 so that the user may refer to the information and select management information as desired. The processor 250 then assigns the management information selected by the user, which may include a name such as "ROOM1", "ROOM2" and "CORR", to the first group GROUP1 through the third group GROUP3, as shown in FIG. 4.

In addition, when the first ID information LED-1 through the seventh ID information LED-7 of the first LED lighting device 100-1 through the seventh LED lighting device 100-7 are classified into the first group GROUP1 and the second group GROUP2 as shown in FIG. 5, the processor 250 displays informations on the first group GROUP1 and the second group GROUP2 on the display device 300 so that the user may refer to the information and select management information as desired. The processor 250 then assigns the management information selected by the user, which may include a name such as "ROOM1/2" and "CORR", to the first group GROUP1 and the second group GROUP2, as shown in FIG. 5.

The management information may be assigned arbitrarily according to the user's preference so that the user can easily identify and control the LED lighting devices.

The processor 250 then displays the management information by executing the fourth instruction. That is, the processor 250 provides the management information of each ID group to the user via the display device 300 so that the user may control the first LED lighting device 100-1 through the seventh LED lighting device 100-7.

The processor 250 controls the first LED lighting device 100-1 through the seventh LED lighting device 100-7 based on the management information and the user command by executing the fifth instruction.

In one embodiment, when the user desires to turn off the first LED lighting device 100-1 and the second LED lighting device 100-2 installed in the Room #1, the user may input a user command "ROOM1-OFF" by referring to the display device 300 and using the input means. The processor 250 then transmits the ID informations associated with the management information ROOM1, i.e., the first ID information LED-1, the second ID information LED-2 and a control command "OFF" to each of the first LED lighting device 100-1 through the seventh LED lighting device 100-7. The lighting controller 150 in each of the first LED lighting device 100-1 through the seventh LED lighting device 100-7 then compares the ID information stored therein with the first ID information LED-1 and the second ID information LED-2 received from the processor 250. The first LED lighting device 100-1 and the second LED lighting device 100-2 storing the ID informations which are identical to the first ID information LED-1 and the second ID information LED-2, respectively, turn themselves off according to the control command "OFF".

In another embodiment, when the user desires to change the color of the third LED lighting device 100-3 and the fourth LED lighting device 100-4 installed in the Room #2 into red, the user may input a user command "ROOM2-RED_CHANGE" by referring to the display device 300 and using the input means. The processor 250 then transmits the ID informations associated with the management information ROOM2, i.e., the third ID information LED-3, the fourth ID information LED-4 and a control command "RED_CHANGE" to each of the first LED lighting device 100-1 through the seventh LED lighting device 100-7. The lighting controller 150 in each of the first LED lighting device 100-1 through the seventh LED lighting device 100-7 then compares the ID information stored therein with the third ID information LED-3 and the fourth ID information LED-4. The third LED lighting device 100-3 and the fourth LED lighting device 100-4 storing the ID informations which are identical to the third ID information LED-3 and the fourth ID information LED-4, respectively, change the color thereof into red according to the control command "RED_CHANGE".

In yet another embodiment, when the user desires to turn on the fifth LED lighting device 100-5 through the seventh LED lighting device 100-7 installed in the Corridor, the user may input a user command "CORRIDOR-1min-ON" by referring to the display device 300 and using the input means. The processor 250 then transmits the ID informations associated with the management information CORR, i.e., the fifth ID information LED-5 through the seventh ID information LED-7 and a control command "1min-ON" to each of the first LED lighting device 100-1 through the seventh LED lighting device 100-7. The lighting controller 150 in each of the first LED lighting device 100-1 through the seventh LED lighting device 100-7 then compares the ID information stored therein with the fifth ID information LED-5 through the seventh ID information LED-7 received from the processor 250. The fifth LED lighting device 100-5 through the seventh LED lighting device 100-7 storing the ID informations which are identical to the fifth ID information LED-5 through the seventh ID information LED-7, respectively, turn themselves on after one minute according to the control command "1min-ON".

The processor 250 may transmit one or more control commands and the ID information associated with the management information ROOM1, the management information ROOM2 and the management information CORR to each of the first LED lighting device 100-1 through the seventh LED lighting device 100-7 simultaneously.

When the user desires to control the first LED lighting device 100-1 through the seventh LED lighting device 100-7 using a smart phone (not shown), the user may manipulate the smart phone to generate a request message requesting the management information via an inputting means of the smart phone. The smart phone then transmits the request message to the central controller 200.

The processor 250 transmits the management information to the smart phone in response to the request thereof by executing the sixth instruction. That is, when the processor 250 receives the request message from the smart phone, the processor 250 transmits the management information, i.e., the management informations ROOM1, ROOM2 and CORR.

The processor 250 then controls the first LED lighting device 100-1 through the seventh LED lighting device 100-7 based on the user command received from the smart phone by executing the seventh instruction.

For instance, when the first user staying in the Room #1 shown in FIG. 4 desires to turn on the first LED lighting device 100-1 and the second LED lighting device 100-2 installed in the Room #1, the first user may input the user command "ROOM1-ON" via the inputting means included in the smart phone. The processor 250 then transmits the ID informations associated with the management information ROOM1, i.e., the first ID information LED-1 and the second ID information LED-2 and the control command "ON" to each of the first LED lighting device 100-1 through the seventh LED lighting device 100-7. The lighting controller 150 in each of the first LED lighting device 100-1 through the seventh LED lighting device 100-7 then compares the ID information stored therein with the first ID information LED-1 and the second ID information LED-2. The first LED lighting device 100-1 and the second LED lighting device 100-2 storing ID informations which are identical to the first ID information LED-1 and the second ID information LED-2, respectively, turn themselves on according to the control command "ON".

In addition, when the second user staying in the Room #2 shown in FIG. 2 desires to change the color of the third LED lighting device 100-3 and the fourth LED lighting device 100-4 installed in the Room #2 into red, the second user may input a user command "ROOM2-RED_CHANGE" via the inputting means included in the smart phone. The processor 250 then transmits the ID informations associated with the management information ROOM2, i.e., the third ID information LED-3 and the fourth ID information LED-4 and the control command "RED_CHANGE" to each of the first LED lighting device 100-1 through the seventh LED lighting device 100-7. The lighting controller 150 in each of the first LED lighting device 100-1 through the seventh LED lighting device 100-7 then compares the ID information stored therein with the third ID information LED-3 and the fourth ID information LED-4. The third LED lighting device 100-3 and the fourth LED lighting device 100-4 storing ID informations which are identical to the third ID information LED-3 and the fourth ID information LED-4, respectively, change the color thereof red according to the control command "RED_CHANGE".

Hereinafter, a LED lighting control method carried out in the LED lighting control system in accordance with the present invention is described in more detail.

Figure 6:
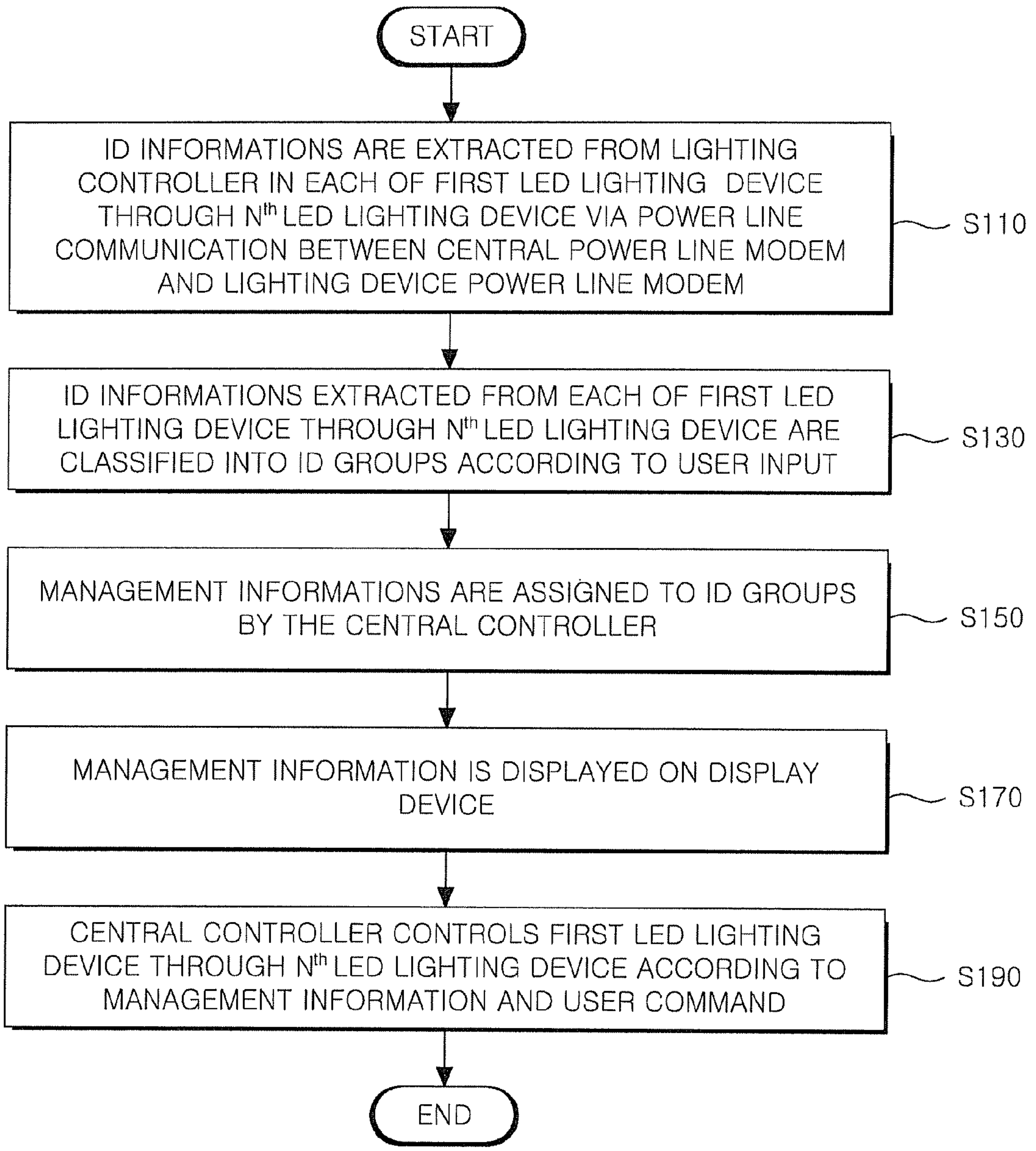
FIG. 6 is a flow diagram illustrating an embodiment of a LED lighting control method in accordance with the present invention.

FIG. 6 is a flow diagram illustrating an embodiment of a LED lighting control method in accordance with the present invention.

Referring to FIG. 6, the central controller performs power line communication with the central power line modem and the lighting device power line modem to extract ID informations from the lighting controller in each of a first LED lighting device through an $N^{th}$ LED lighting device (S110).

Specifically, the central controller performs the power line communication with the first LED lighting device through the $N^{th}$ LED lighting device by executing a management program and extracts the ID informations from the first LED lighting device through the $N^{th}$ LED lighting device. More specifically, the central controller extracts the ID informations from each of the first LED lighting device through the $N^{th}$ LED lighting device by executing the first instruction included in a management program.

Thereafter, the ID informations extracted from each of the first LED lighting device through the $N^{th}$ LED lighting device, namely a first ID information through $N^{th}$ ID information, respectively, are classified into ID groups according to a user input (S130).

Specifically, the central controller provides the ID informations via the display device connected to the central controller to a user. When the user provides the user input for the ID groups by referring to the display device, the central controller executes the management program to classify the ID informations into the ID groups according to the user input. More specifically, the central controller classifies the ID informations into the ID groups by executing the second instruction included in the management program.

Thereafter, the management informations are assigned to the ID groups by the central controller (S150).

Specifically, the central controller provides the ID groups to the user by displaying the same on the display device. When the user provides the user input for the management information via the inputting means by referring to the display device, the central controller assigns the management information to each of the ID groups according to the user input. More specifically, the central controller assigns the management information to each of the ID groups by executing the third instruction included in the management program.

Thereafter, the management informations are displayed on the display device (S170).

Specifically, the central controller displays the management informations on the display device. More specifically, the central controller displays the management informations on the display device by executing the fourth instruction included in the management program so that the user may refer to the management information.

Thereafter, the central controller controls the first LED lighting device through the $N^{th}$ LED lighting device according to the management informations and a user command. (S190).

Specifically, when the user is provided with the management informations via the display device, the user may input the user command for controlling the first LED lighting device through the $N^{th}$ LED lighting device. When the central controller receives the user command, the central controller generates a control command reflecting the user command by executing the management program, and then transmits the control command and the ID information corresponding to the management information selected by the user to the first LED lighting device through the $N^{th}$ LED lighting device. Each of the first LED lighting device through the $N^{th}$ LED lighting device compares the ID information stored therein with the ID information received from the central controller. When the ID information stored therein matches the ID information received from the central controller, any of the first LED lighting device through the $N^{th}$ LED lighting device with the matching ID information execute the control command. That is, the first LED lighting device through the $N^{th}$ LED lighting device can by controlled by the central controller by executing the fifth instruction included in the management program.

The first LED lighting device through the $N^{th}$ LED lighting device according to commands from the external terminal device by communicating with the external terminal device such as the smart phone and the computing device in accordance with the LED lighting control method of present invention.

Hereinafter, a LED lighting control method in accordance with the present invention for controlling the first LED lighting device through the $N^{th}$ LED lighting device using the external terminal device is described in more detail.

Figure 7:
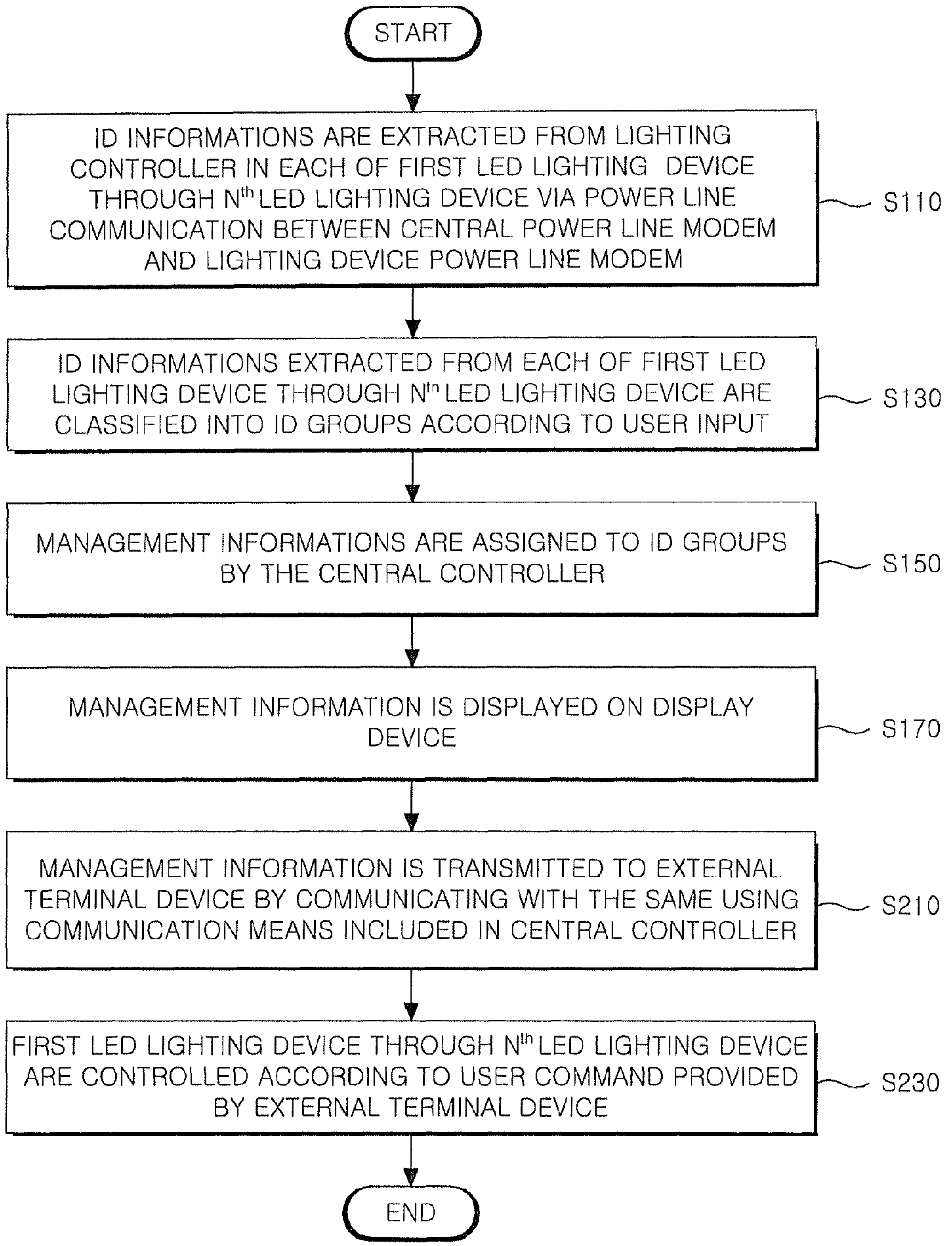
FIG. 7 is a flow diagram illustrating another embodiment of a LED lighting control method in accordance with the present invention.

FIG. 7 is a flow diagram illustrating another embodiment of a LED lighting control method in accordance with the present invention.

The step S110 through the step S170 of another embodiment in accordance with the LED lighting control method of the present invention shown in FIG. 7 are identical to that shown in FIG. 6. That is, the step S210 and the step S230 shown in FIG. 7 are carried out after the step S110 through the step S170 shown in FIG. 6. Therefore, a detailed description of the step S110 through the step S170 shown in FIG. 7 is omitted, and only the steps S210 and S230 shown in FIG. 7 are described below in more detail.

Referring to FIG. 7, the management information is transmitted to the external terminal device by communicating with the same using the communication means included in the central controller (S210).

Specifically, when the user manipulates the external terminal device to generate the request message requesting the management information using the user inputting means such as a keypad to transmit the request message to the central controller, the central controller executes the management program to transmit the management information to the external terminal device. More specifically, the central controller transmits the management information by executing the sixth instruction included in the management program.

Thereafter, the first LED lighting device through the $N^{th}$ LED lighting device are controlled according to a user command provided by the external terminal (S230).

Specifically, when the external terminal device receives the management information transmitted from the central controller, the user may provide the user command for controlling the first LED lighting device through the $N^{th}$ LED lighting device by referring to and manipulating the external terminal device. The user command provided by the user is then transmitted from the external terminal device to the central controller, and the central controller executes the management program to generate the control command corresponding to the user command and transmits the control command and the ID information corresponding to the management information to the first LED lighting device through the $N^{th}$ LED lighting device. Each of the first LED lighting device through the $N^{th}$ LED lighting device then compares the ID information stored therein with the ID information received from the central controller. Any LED lighting device with the matching the ID information then execute the control command. More specifically, the first LED lighting device through the $N^{th}$ LED lighting device can by controlled by the central controller by executing the seventh instruction included in the management program.

While the present invention has been particularly shown and described with reference to the preferred embodiment thereof, it will be understood by those skilled in the art that various changes in form and details may be effected therein, without departing from the spirit and scope of the invention as defined by the appended claims.

The invention claimed is:

1. A LED lighting system comprising:

a first lighting device through an $N^{th}$ lighting device wherein each of the first lighting device through the $N^{th}$ lighting device comprises a light source, a lighting device power line modem for performing a power line communication and a lighting controller for controlling the light source and the lighting device power line modem, the first lighting device through the $N^{th}$ lighting device storing a first ID information through an $N^{th}$ ID information in the lighting controller thereof, respectively; and a central controller for controlling each of the first lighting device through the $N^{th}$ lighting device wherein the central controller comprises a central power line modem connected to the lighting device power line modem of each of the first lighting device through the $N^{th}$ lighting device through power lines to perform the power line communication, a memory for storing a management program for managing the first lighting device through the $N^{th}$ lighting device; and a processor for executing the management program stored in the memory, wherein the management program comprises:

a first instruction for extracting the first ID information through the $N^{th}$ ID information from the first lighting device through the $N^{th}$ lighting device, respectively, through the power line communication between the lighting device power line modem of each of the first lighting device through the $N^{th}$ lighting device and the central power line modem;

a second instruction for classifying the first ID information through the $N^{th}$ ID information extracted by the first instruction into ID groups according to a user input;

a third instruction for assigning a management information to each of the ID groups classified by the second instruction; and a fourth instruction for displaying the management information (where N is a natural number).

2. The system in accordance with claim 1, wherein the first instruction comprises:

a first sub-instruction for generating a request message requesting the first ID information through the $N^{th}$ ID information, and transmitting the request message to the lighting device power line modem of each of the first lighting device through the $N^{th}$ lighting device through the central power line modem; and a second sub-instruction for receiving the first ID information through the $N^{th}$ ID information from the lighting controller of each of the first lighting device through the $N^{th}$ lighting device through the lighting device power line modem of each of the first lighting device through the $N^{th}$ lighting device, respectively.

3. The system in accordance with claim 1, further comprising a display device connected to the central controller for displaying the first ID information through the $N^{th}$ ID information and the management information.

4. The system in accordance with claim 3, wherein the second instruction comprises:

a first sub-instruction for transmitting the first ID information through the $N^{th}$ ID information to the display device; and a second sub-instruction for classifying the first ID information through the $N^{th}$ ID information into the ID groups according to the user input.

5. The system in accordance with claim 1, wherein the management program further comprises a fifth instruction for controlling the first lighting device through the $N^{th}$ lighting device according to the management information and a user command.

6. The system in accordance with claim 5, wherein the fifth instruction issues one of an on/off command for turning on or off each of the first lighting device through the $N^{th}$ lighting device, a dimming control command for dimming each of the first lighting device through the $N^{th}$ lighting device, a color control command for selecting a color of light emitted from each of the first lighting device through the $N^{th}$ lighting device and a timer control command for controlling on-time or off-time of each of the first lighting device through the $N^{th}$ lighting device to control each of the first lighting device through the $N^{th}$ lighting device.

7. The system in accordance with claim 1, wherein the central controller further comprises a communication means for communicating with an external terminal device.

8. The system in accordance with claim 7, wherein the management program further comprises a sixth instruction for transmitting the management information to the external terminal device in response to a request from the external terminal device.

9. The system in accordance with claim 8, wherein the management program further comprises a seventh instruction for controlling each of the first lighting device through the $N^{th}$ lighting device according to a user command provided by the external terminal device.

10. A method for controlling a first lighting device through an $N^{th}$ lighting device of a LED lighting system comprising a central controller for controlling the first lighting device through the $N^{th}$ lighting device, wherein each of the first lighting device through the $N^{th}$ lighting device comprises a light source, a lighting device power line modem for performing a power line communication and a lighting controller for controlling the light source and the lighting device power line modem, the first lighting device through the $N^{th}$ lighting device storing a first ID information through an $N^{th}$ ID information in the lighting controller thereof, respectively; and the central controller for controlling each of the first lighting device through the $N^{th}$ lighting device wherein the central controller comprises a central power line modem connected to the lighting device power line modem of each of the first lighting device through the $N^{th}$ lighting device through power lines to perform the power line communication, a memory for storing a management program for managing the first lighting device through the $N^{th}$ lighting device; and a processor for executing the management program stored in the memory, the method comprising:

(a) extracting the first ID information through the $N^{th}$ ID information from the lighting controller of each of the first lighting device through the $N^{th}$ lighting device, respectively, through the power line communication between the lighting device power line modem of each of the first lighting device through the $N^{th}$ lighting device and the central power line modem;

(b) classifying the first ID information through the $N^{th}$ ID information extracted by the central controller into ID groups according to a user input;

(c) assigning a management information to each of the ID groups classified by the central controller; and (d) displaying the management information.

11. The method in accordance with claim 10, wherein the step (a) comprises:

(a-1) transmitting a request message requesting the first ID information through the $N^{th}$ ID information generated by the central controller to the lighting controller of each of the first lighting device through the $N^{th}$ lighting device, (a-2) modulating the first ID information through the $N^{th}$ ID information into a PLC signal using the lighting controller of each of the first lighting device through the $N^{th}$ lighting device to be transmitted to the central controller; and (a-3) demodulating the PLC signal into the first ID information through the $N^{th}$ ID information.

12. The method in accordance with claim 10, wherein the step (b) comprises:

(b-1) transmitting the first ID information through the $N^{th}$ ID information to a display device connected to the central controller; and (b-2) classifying the first ID information through the $N^{th}$ ID information into the ID groups according to the user input.

13. The method in accordance with claim 10, further comprising (e) controlling the first lighting device through the $N^{th}$ lighting device according to the management information and a user command after performing the step (d).

14. The method in accordance with claim 13, wherein the step (e) comprises:

(e-1) transmitting at least one ID information associated with the management information and a control command corresponding to the user command to each of the first lighting device through the $N^{th}$ lighting device by the central controller: and (e-2) executing the control command in any of the first lighting device through the $N^{th}$ lighting device having an ID information matching the ID information transmitted in the step (e-1).

15. The method in accordance with claim 14, wherein the control command comprises one of an on/off command for turning on or off each of the first lighting device through the $N^{th}$ lighting device, a dimming control command for dimming each of the first lighting device through the $N^{th}$ lighting device, a color control command for selecting a color of light emitted from each of the first lighting device through the $N^{th}$ lighting device and a timer control command for controlling on-time or off-time of each of the first lighting device through the $N^{th}$ lighting device to control each of the first lighting device through the $N^{th}$ lighting device.

16. The method in accordance with claim 10, further comprising (f) communicating with an external terminal device using a communication means controlled by the central controller after performing the step (d).

17. The method in accordance with claim 16, wherein the step (f) comprises transmitting the management information to the external terminal device in response to a request from the external terminal device.

18. The method in accordance with claim 17, further comprising, (g) controlling each of the first lighting device through the $N^{th}$ lighting device according to a user command provided by the external terminal device after performing the step (f).

* * * * *